Jan. 31, 1967  A. E. KUNZLER ETAL  3,301,415
VEHICLE DUMPING APPARATUS

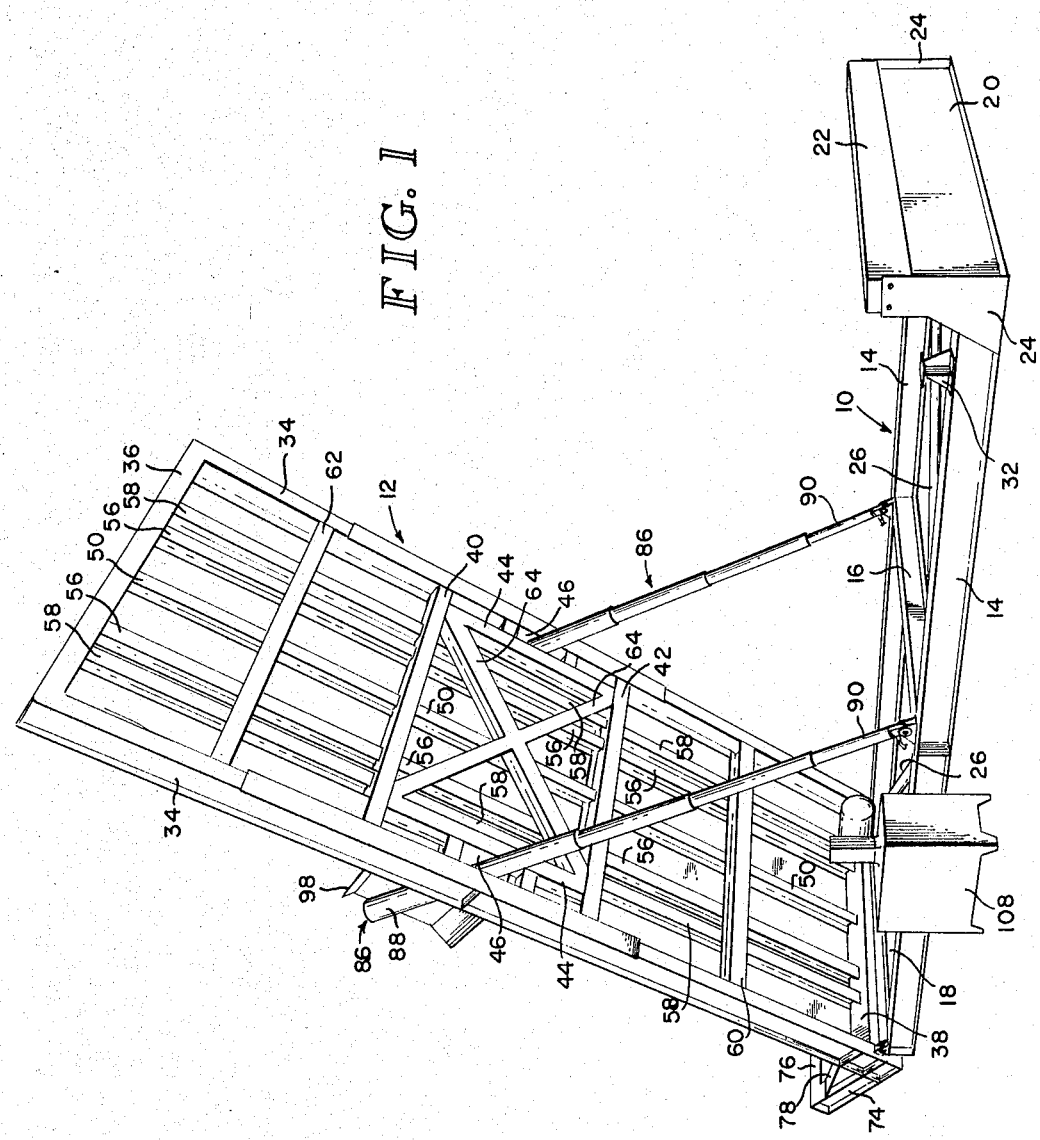

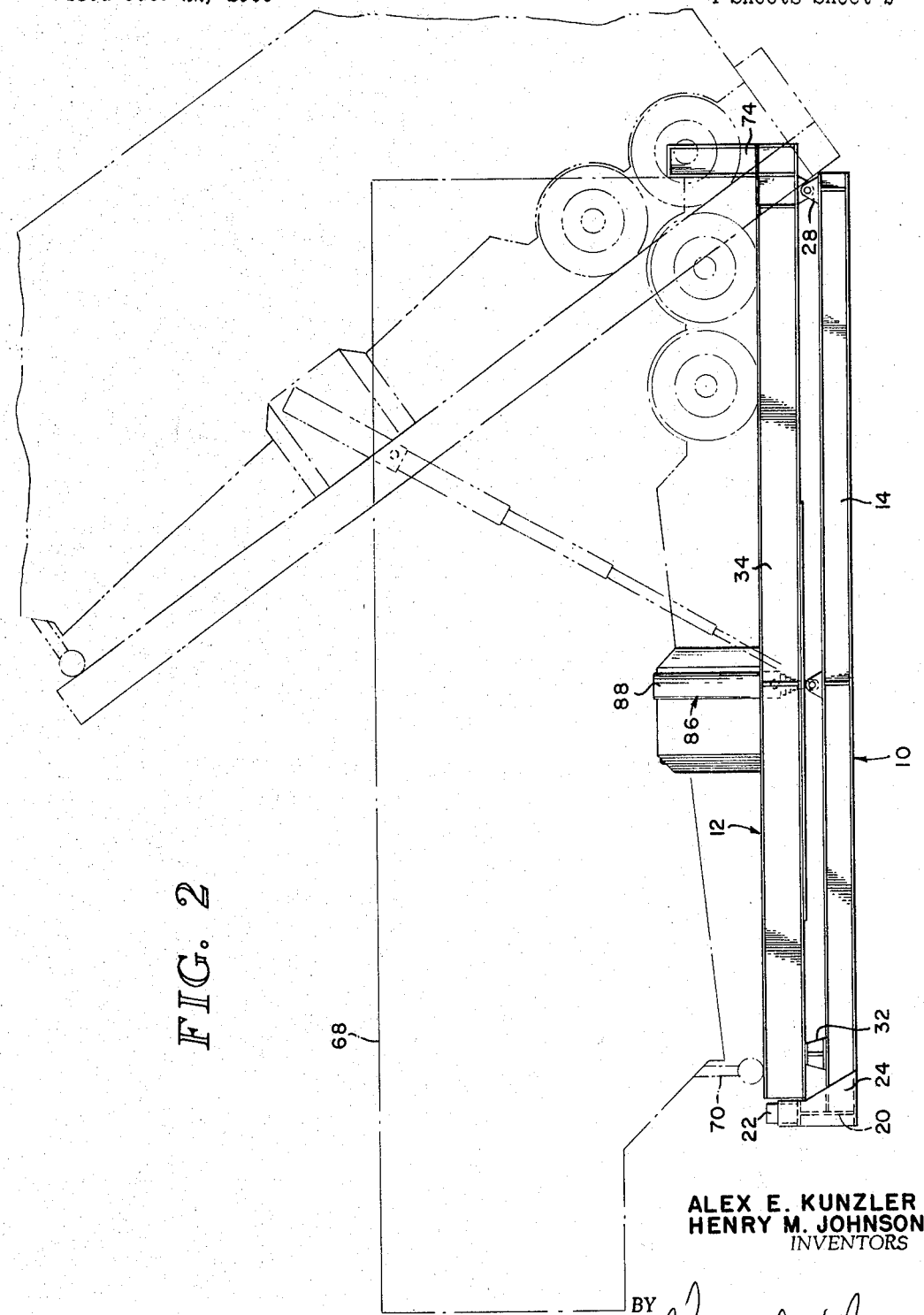

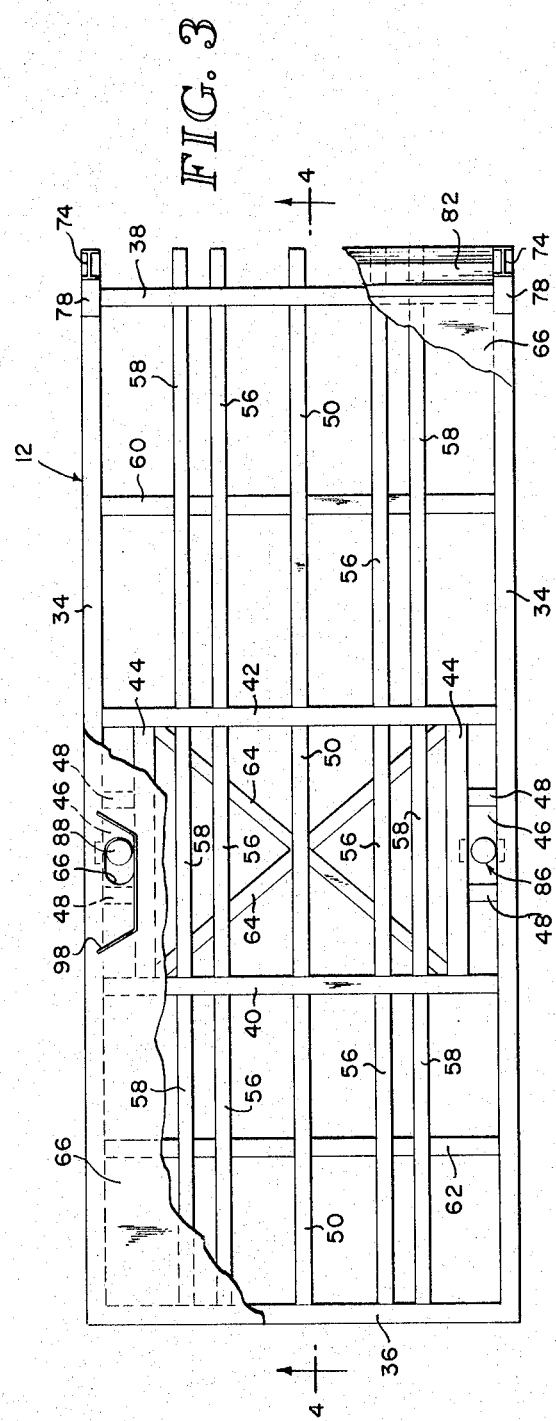
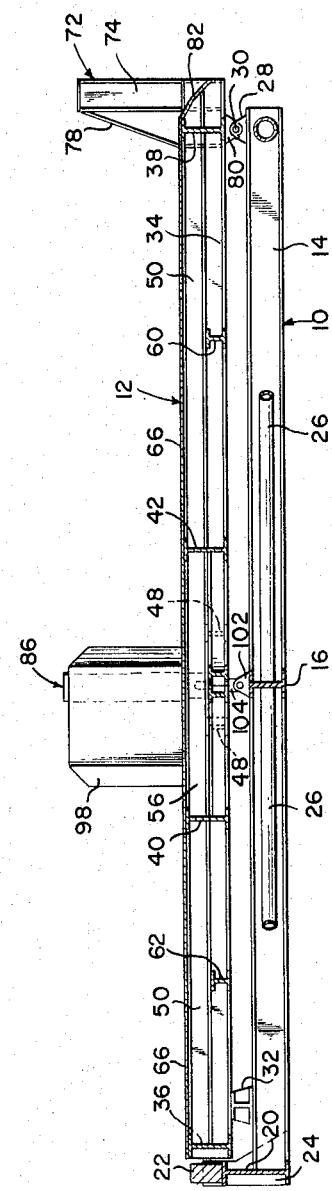

Filed Oct. 22, 1965  4 Sheets-Sheet 4

INVENTORS
ALEX E. KUNZLER
HENRY M. JOHNSON
BY
*Graybeal, Cole & Barnard*
ATTORNEYS

United States Patent Office 3,301,415
Patented Jan. 31, 1967

3,301,415
VEHICLE DUMPING APPARATUS
Alex E. Kunzler, Kent, and Henry M. Johnson, Des Moines, Wash., assignors to Leckenby Company, Seattle, Wash., a corporation of Washington
Filed Oct. 22, 1965, Ser. No. 501,267
2 Claims. (Cl. 214—49)

This invention relates to improvements in a vehicle dumping apparatus and more particularly does it relate to new and novel improvements in an apparatus for elevating a vehicle or trailer to an inclined position to discharge loads therein through the end or tail gate and into a receiving means such as hoppers, pits, containers, conveyors and the like.

Many businesses and industries have need of equipment which will rapidly unload trailers and trucks of many descriptions and capacities. Heretofore known devices for vehicle dumping have required a permanent installation involving concrete foundations or pits to house the operating mechanisms and bed of the dumper. Such installations by their nature, are below ground level and are permanent, and therefore are immobile-type structures. Such permanent-type dumper installations are complicated, expensive, and inefficient.

The present invention is intended and designed to overcome the deficiencies, drawbacks and disadvantages of hithertofore known dumpers. This invention embraces a portable or readily mobile dumper which may be moved from one location or site to another, and prepared for use in a relatively short period of time. The portability or mobility feature of this invention and its uniquely simple design, is such as to make the dumper of this invention movable for in-plant and over-the-highway location changes. The invention embraces a portable bed having a pivotal dumper platform thereon with the platform at its rear or pivotal end having an upstanding trailer-engaging stop or holding means so that the trailer, truck or vehicle is prevented from sliding or rolling off the platform during the dumping operation.

Accordingly, it is primary feature of the present invention to provide a vehicle dumping apparatus which is portable and mobile and therefore eliminates the permanent platform supporting installations of hithertofore known dumpers.

It is another feature of this invention to supply a vehicle dumping apparatus which is simple in design, rugged in construction, and comparatively inexpensive to produce.

Still another feature of this invention is to furnish a vehicle dumping apparatus which may be moved from location to location and readied for use in a relatively short time, as well as being capable of being transported on highways and other public roads in its fully assembled state.

Yet another feature of this invention is to provide a vehicle dumping apparatus which permits a slightly higher raising of the platform than is possible in heretofore known devices.

A further feature of this invention is to supply a vehicle dumping apparatus which will accommodate trucks, trailers, and other vehicles of various descriptions, sizes and specifications.

An even further feature of this invention is to furnish a vehicle dumping apparatus which has unique trussing and framing in the platform thereof to prevent distortion of the platform by the landing gear and wheels on certain types of trucks and trailers.

A still further feature of this invention is to provide a vehicle dumping apparatus wherein the portable bed portion thereof uses tubular frame members so that contents spilled from truck or trailer loads does not build up thereon to impair operation of the platform.

These, and other features, objects and advantages which will become subsequently apparent, reside in the details of construction and operation as more fully hereinafter described and claimed. Reference will be had to the accompanying drawings, forming a part thereof, wherein like numerals refer to like parts throughout, and in which:

FIGURE 1 is a perspective view of the dumper showing the platform in its extreme up position;

FIGURE 2 is a side elevational view of the dumper showing the platform in its full down position, and illustrating in dash-dot lines the configuration of a large semi-trailer as received on the platform and as it would appear during a dumping operation;

FIGURE 3 is a partial plan view with sections broken away to show further details of the platform;

FIGURE 4 is an elevational cross section view taken along the line 4—4 of FIGURE 3, and further illustrating details of construction of both the bed and the platform;

Figure 5:
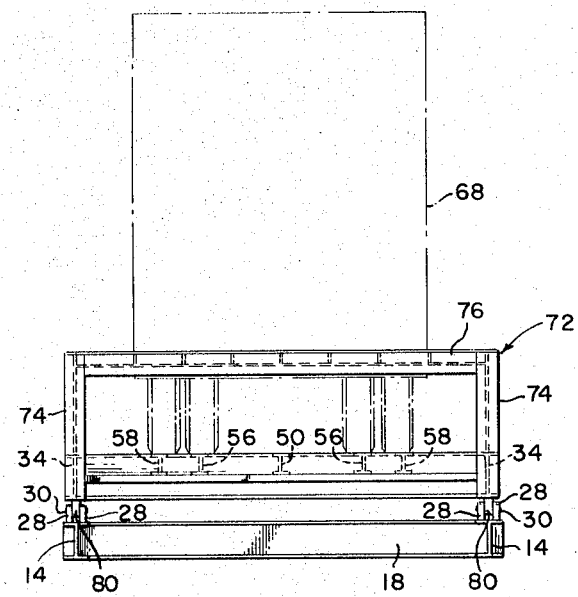
FIGURE 5 is a rear elevational view showing details of the trailer engaging stop means at the rear of the platform.
Figure 6:
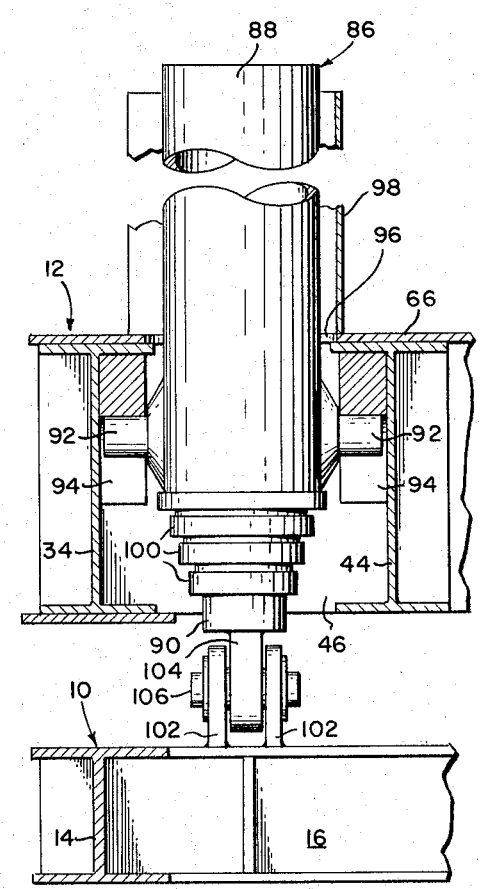
FIGURE 6 is a partial view in cross section, showing the details of the cylinder-engaging portions of the platform.
Figure 7:
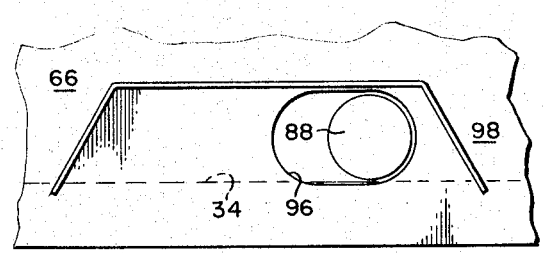
FIGURE 7 is a partial top plan view of the cylinder protection shield as mounted on the platform.

Referring now to the drawings, and particularly FIGURES 1 through 4, it will be seen that the dumper has a bed generally designated by the number 10, and a pivotal platform generally designated by the number 12. Bed 10 is a generally rectangular frame having longitudinal side frame members 14, intermediate cross frame member 16 and rear interconnecting or cross frame member 18. Members 14, 16 and 18 are generally of the same dimensions. A forward or front cross frame member 20, which like other bed frame members is preferably an I-beam, has a deeper web portion than frame members 14, 16 and 18. Atop the upper flange of forward cross frame member 20 is a timber 22 to fill the gap above member 20 and the upper surface of platform 12. Retaining plates 24 are attached at both ends of front or forward cross member 20, to secure timber 22 in position. Bed 10 also has round tubular trussing members 26 which, as can be seen from FIGURES 1 and 4, are limited to one each of members 26 on either side of the intermediate cross frame member 16. Thus, single, tubular trussing members 26 positioned diagonally as shown impart the necessary rigidity to bed 10. At the rear end of each of the longitudinals 14 of bed 10 are pairs of spaced-apart journal brackets 28 in which platform 12 pivots when it is raised to the dumping position. Said journal brackets 28 support short pivot shafts 30 and are located generally over the rear cross frame member 18. At the forward end of bed 10 near forward cross frame member 20, are platform support pads 32 secured to the outside longitudinals 14 of said bed 10 to receive platform 12.

The pivotal dumping platform 12 is a rectangular frame structure of approximately the same dimensions as bed 10 and has main or primary outer longitudinal or side frame members 34 with main front end cross frame member 36 and main rear cross frame member 38 which is located directly above rear cross frame member 18 of bed 10. It will be noted that the main outer frame members 34, 36 and 38 of platform 12 are generally of I-beam construction with greater web depths than the I-beam frame members of bed 10. It will also be noticed that platform 12 has a main forward intermediate cross frame member 40 and a main rear intermediate cross frame member 42, both of which are of generally the same structural dimensions as the outer main platform frame members. Spaced a short distance inwardly from main outside longitudinals 34 and extending longitudinally between the forward and rearward intermediate main cross frame members 40 and 42 are inner cylinder support frame members 44. Thus, there is defined cylinder-accommodating spaces 46. All frame members thus far described in the platform are of a substantially uniform dimension. Rigidity is added between the shorter or intermediate longitudinals 44 and the main longitudinals 34 by virtue of lighter cross pieces 48 for rigidizing that part of the platform connected to the upper end of the cylinder structure.

A number of additional secondary frame members are included in the platform structure. These additional secondary frame members are of approximately half the I-beam web depth of the platform frame members previously described. A center longitudinal is attached in segments between the main front, rear, and two intermediate cross members. Thus, front center longitudinal 50 is located generally on the longitudinal center line of the platform. Between the center longitudinals 50 and either of the two main outside longitudinal frame members 34, are additional double or paired longitudinal frame members 56, and 58. It will be noted that all of the secondary longitudinals 50, 56 and 58 are of smaller dimensions than the primary frame members. The platform frame structure is designed so that the secondary longitudinals 50, 56 and 58 present their upper surfaces substantially coplanar with the upper surfaces of the primary frame members. Additional rigidizing structure is provided in the secondary frame members by the addition of rear secondary cross frame member 60 between primary cross frame members 42 and 38, toward the rear of the platform, and another secondary cross frame member 62 between primary frame members 40 and 36 toward the front of the platform. It will be noted that secondary cross frame members 60 and 62, being lighter and smaller, extend between the outer main longitudinals 34 and also are connected on the underside of the secondary longitudinals as best seen in FIGURES 1, 3 and 4. Between the main intermediate cross members 40 and 42, and attached to the underside of the secondary longitudinals are diagonal members 64. The frame of platform 12 has attached to the upper side thereof, a plate of sheet 66 of steel or other appropriate material. The platform surface 66 is welded to the frame members and acts as a diaphragm in the platform structure so that wheel-loading forces are transferred to the frame members. The double longitudinals in the secondary frame structure are incorporated for a specific reason. As can be seen by reference to FIGURE 5, loading of most trailers and trucks will be on dual wheels. Also, in trailer structure, as seen in FIGURE 2 in dash-dot lines, the trailers 68 will have landing gears 70. It has been found that the concentrated loading of wheels and landing gears on the platform structure tended to deform surface member 66, since wheel spacing and landing gear spacing on trailers and trucks would vary to some extent. Hence, it was found necessary to utilize a double secondary longitudinal frame structure as characterized by the members 56 and 58. Distortion in the platform surface is avoided by effectively covering the range of widths which may be involved either with truck or trailer wheels, or with landing gear by employing the double secondary trussing.

At the rear end of the platform is a trailer-engaging and stop means 72 having upstanding side frame members 74 rigidly anchored to the rearmost edge of the platform, and a horizontal member 76 interconnecting the upper ends of upstanding members 74. Horizontal member 76 is spaced above the platform level so as to engage the lower rear end of the truck or trailer body as shown in FIGURES 2 and 5. Triangular reinforcing members 78 are added to the forward edge of upstanding members 74 in order to securely anchor the stop and retaining means 72 to the platform. On the underside of the platform beneath rear main cross frame member 38 is a downwardly extending pivot hinge 80 which is received between the journal brackets 28 and through which a hole is provided to accept a pivot shaft 30. It will be seen that the rearmost edge of the platform is slanted downwardly as best observed in FIGURE 4, as at 82.

Raising and lowering of the platform is accomplished by two telescoping-type cylinder mechanisms, generally designated by the numbers 86. The large cylinder housing 88 is pivotally attached to the platform 12 while the piston end 90 is pivotally attached to the bed 10. Cylinder housings 88 have short and coaxially aligned trunnion shafts 92 which are detachably received in appropriate recesses in trunnion blocks 94 attached or secured to the primary longitudinals 34 and 44, in the cylinder space 46. It will be noted that the aligned short trunnion shafts 92 on the cylinder housing 88 are located near the lower end of the housing, with the greater portion of the cylinder housing extending upwardly through an opening 96 in platform cover 66. Since the cylinder housing extends above the surface level of platform 12, shields 98 are attached to the surface 66 so that the cylinder housings are protected. By arranging the cylinders so that their housings are pivoted on the platform and the piston ends attached to the bed, it has been found that a cylinder of given extension will raise the platform higher than in an instance where the housing is pivoted on the bed and the piston end of the cylinder is attached to the platform.

What is claimed is:

1. A portable vehicle dumping apparatus, comprising: (a) a generally rectangular portable support bed structure including longitudinal side frame members, and front, rear and intermediate bed cross frame members extending between and connecting said longitudinal side frame members; (b) a generally rectangular pivotal vehicle supporting and dumping platform supported on said bed having main side frame members and main front end, rear end and a pair of spaced-apart intermediate interconnecting members, said platform being hinged at the rear end thereof to the rear end of said portable bed structure and having a metal plate covering thereon, said platform also having a generally rigid and upstanding holding frame located at the rear end thereof for engaging a vehicular body and retaining same on said platform when said platform is pivoted upwardly, said platform further having secondary supporting frame structure including a secondary center longitudinal and also including secondary longitudinal frame pairs located between said secondary center longitudinal and each of said main side frame members for supporting the load bearing wheels of a vehicle, said secondary frame pairs extending the length of said platform between said main front end, rear and intermediate interconnecting members; and (c) a pair of telescoping, hydraulically actuated cylinders for raising and lowering said platform, said cylinders being positioned with the cylinder housings pivotally mounted on the inner sides of said platform main side frame members and extending upwardly through openings in said platform covering, said cylinders having the piston ends thereof pivotally attached to said portable bed structure.

2. A portable vehicle dumping apparatus, comprising: (a) a generally rectangular portable support bed structure including longitudinal side frame members, and front, rear and intermediate bed cross frame members extending between and connecting said longitudinal side frame members; (b) a generally rectangular pivotal vehicle supporting and dumping platform having main longitudinal frame members and main front end, rear end and at least two intermediate interconnecting members, said platform having a metal plate covering thereon and being hinged at the rear end thereof to the rear end of said portable bed structure; said platform further having a generally upstanding holding frame located at the rear end thereof for engaging a vehicular body and retaining same on said platform when said platform is pivoted upwardly, said platform main intermediate interconnecting members being located generally in the center portion of said platform and being interconnected by a shorter intermediate longitudinal in spaced relation to and on one side of each of said main longitudinals to define cylinder accommodating spaces between said main and said intermediate longitudinals; and (c) a pair of telescoping, hydraulically actuated cylinders for raising and lowering said platform, said cylinders being positioned with the cylinder housings pivotally mounted in said cylinder accommodating spaces of said platform between said main and intermediate longitudinals and extending upwardly through said spaces, said cylinders having the piston ends thereof pivotally attached to said portable bed structure.

References Cited by the Examiner
UNITED STATES PATENTS

| | | | |
|---|---|---|---|
| 2,603,366 | 7/1952 | Adams | 214—49 |
| 2,761,573 | 9/1956 | Fulper | 214—49 |
| 3,075,660 | 1/1963 | Kelley | 214—49 |

GERALD M. FORLENZA, *Primary Examiner.*

ROBERT G. SHERIDAN, *Examiner.*